（12）United States Patent
McCune et al.

(10) Patent No.: US 9,115,650 B2
(45) Date of Patent: Aug. 25, 2015

(54) RING GEAR MOUNTING ARRANGEMENT WITH OIL SCAVENGE SCHEME

(71) Applicant: UNITED TECHNOLOGIES CORPORATION, Harford, CT (US)

(72) Inventors: Michael E. McCune, Colchester, CT (US); Lawrence E. Portlock, Bethany, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 14/293,279

(22) Filed: Jun. 2, 2014

(65) Prior Publication Data

US 2014/0286755 A1    Sep. 25, 2014

Related U.S. Application Data

(63) Continuation of application No. 13/484,579, filed on May 31, 2012, now Pat. No. 8,740,740, which is a continuation of application No. 13/437,442, filed on Apr. 2, 2012, now Pat. No. 8,764,604, which is a continuation of application No. 11/504,220, filed on Aug. 15, 2006, now Pat. No. 8,753,243.

(51) Int. Cl.
*F16H 57/021*   (2012.01)
*F02C 7/36*   (2006.01)
(Continued)

(52) U.S. Cl.
CPC . *F02C 7/36* (2013.01); *F01D 5/027* (2013.01); *F16H 57/0402* (2013.01);
(Continued)

(58) Field of Classification Search
CPC ... F16H 57/04; F16H 57/0412; F16H 57/042; F16H 57/0421
USPC ................................................. 475/159–160
See application file for complete search history.

(56) References Cited

U.S. PATENT DOCUMENTS 2,684,591 A   7/1954   Lundquist
3,160,026 A   12/1964   Rosen
(Continued)

FOREIGN PATENT DOCUMENTS

CN   1952435 A   4/2007
EP   1114949   7/2001
(Continued)

OTHER PUBLICATIONS

Japanese Office Action for Japanese Application No. 2007-202444, Aug. 3, 2010.
(Continued)

*Primary Examiner* — Derek D Knight

(74) *Attorney, Agent, or Firm* — Carlson, Gaskey & Olds, P.C.

(57) ABSTRACT

A turbine engine includes a fan section including a plurality of fan blades, a turbine section, and an epicyclic gear train coupled between the turbine section and the fan section for providing a speed reduction between turbine section and the fan section. The epicyclic gear train includes a plurality of intermediate gears. A carrier supports the plurality of intermediate gears. A sun gear meshes with the plurality of intermediate gears and a ring gear surrounding and meshing with the plurality of intermediate gears. The ring gear includes first and second portions that each have an inner periphery with teeth. The first and second portions of the ring gear have an outer circumferential surface opposite the teeth that provides a first thickness, a second thickness greater than the first thickness and axially inward from the first thickness, and a flange extending radially away from the axis. An epicyclic gear train for a turbine engine and method of designing an epicyclic gear train are also disclosed.

25 Claims, 2 Drawing Sheets

(51) Int. Cl.
  *F16H 57/04* (2010.01)
  *F01D 5/02* (2006.01)
  *F16H 57/08* (2006.01)

(52) U.S. Cl.
  CPC ......... *F16H 57/042* (2013.01); *F16H 57/0421* (2013.01); *F16H 57/0458* (2013.01); *F16H 57/0482* (2013.01); *F16H 57/08* (2013.01); *F05D 2240/70* (2013.01); *F05D 2260/34* (2013.01); *F05D 2260/40311* (2013.01); *Y10T 29/49462* (2015.01)

(56) References Cited

U.S. PATENT DOCUMENTS

| | | | |
|---|---|---|---|
| 3,352,178 | A | 11/1967 | Lindgren et al. |
| 3,722,323 | A | 3/1973 | Welch |
| 4,583,413 | A * | 4/1986 | Lack .............................. 475/346 |
| 4,896,499 | A | 1/1990 | Rice |
| 5,081,832 | A | 1/1992 | Mowill |
| 5,211,541 | A | 5/1993 | Fledderjohn et al. |
| 5,302,031 | A | 4/1994 | Yuasa |
| 5,391,125 | A | 2/1995 | Turra et al. |
| 5,433,674 | A | 7/1995 | Sheridan et al. |
| 5,466,198 | A * | 11/1995 | McKibbin et al. ............ 475/346 |
| 5,472,383 | A | 12/1995 | McKibbin |
| 6,223,616 | B1 | 5/2001 | Sheridan |
| 6,402,654 | B1 | 6/2002 | Lanzon et al. |
| 6,530,858 | B1 | 3/2003 | Usoro et al. |
| 6,669,597 | B1 | 12/2003 | Usoro et al. |
| 6,732,502 | B2 | 5/2004 | Seda et al. |
| 7,021,042 | B2 | 4/2006 | Law |
| 7,591,754 | B2 | 9/2009 | Duong et al. |
| 7,662,059 | B2 | 2/2010 | McCune |
| 7,704,178 | B2 | 4/2010 | Sheridan et al. |
| 7,926,260 | B2 | 4/2011 | Sheridan et al. |
| 7,950,151 | B2 | 5/2011 | Duong et al. |
| 8,074,440 | B2 | 12/2011 | Kohlenberg et al. |
| 2002/0064232 | A1 | 5/2002 | Fukuhara et al. |
| 2002/0064327 | A1 | 5/2002 | Toda et al. |
| 2004/0112041 | A1 | 6/2004 | Law |
| 2005/0026745 | A1 | 2/2005 | Mitrovic |
| 2007/0225111 | A1 | 9/2007 | Duong et al. |
| 2008/0006018 | A1 | 1/2008 | Sheridan et al. |
| 2008/0044276 | A1 | 2/2008 | McCune et al. |
| 2008/0096714 | A1 | 4/2008 | McCune |
| 2008/0116009 | A1 | 5/2008 | Sheridan et al. |
| 2009/0053606 | A1 | 2/2009 | Kim et al. |
| 2009/0081039 | A1 | 3/2009 | McCune et al. |
| 2009/0090096 | A1 | 4/2009 | Sheridan |
| 2009/0111639 | A1 | 4/2009 | Klingels |
| 2009/0293278 | A1 | 12/2009 | Duong et al. |
| 2009/0298640 | A1 | 12/2009 | Duong et al. |
| 2011/0130246 | A1 | 6/2011 | McCune et al. |
| 2012/0243971 | A1 | 9/2012 | McCune et al. |

FOREIGN PATENT DOCUMENTS

| | | |
|---|---|---|
| EP | 1876338 A2 | 1/2008 |
| EP | 1890054 A1 | 2/2008 |
| EP | 1925855 A2 | 5/2008 |
| EP | 2224100 | 9/2010 |
| EP | 2559913 A1 | 2/2013 |
| FR | 1357038 | 4/1964 |
| JP | 46-36927 | 10/1971 |
| JP | 5-248267 A | 9/1993 |
| JP | 9-317833 A | 12/1997 |
| JP | 2001-208146 A | 8/2001 |
| JP | 39-20031 B2 | 5/2007 |

OTHER PUBLICATIONS

European Search Report for EP Application No. 07253078.5, Dec. 5, 2007.
Dudley ("Gear Handbook: The design, Manufacture, and Application of Gears", p. 3-15).
European Search Report and Written Opinion for European Application No. EP 12 19 8136 completed on Aug. 21, 2013.
International Search Report and Written Opinion for International Application No. PCT/US2012/071906 completed on Aug. 22, 2013.
Civil Turbojet/Turbofan Specifications, Jet Engine Specification Database (Apr. 3, 2005).
Zalud, "Gears Put a New Spin on Turbofan Performance" Machine Design, Nov. 5, 1998, 2010Penton Media, Inc., 5 pp.
Kandebo; Geared-Turbofan Engine Design Targets Cost, Complexity, Aviation Week & Space Technology; New York; Feb. 23, 1998, 4 pp.
Hendricks et al, "Performance and Weight Estimates for an Advanced Open Rotor Engine" NASA/TM-2012-217710, Sep. 2012, 20 pp.
Gunston, "Jane's Aero-Engines" Pratt & Whitney/USA, Mar. 2000, JAEng-Issue 7, 5 pp.
International Preliminary Report on Patentability for PCT Application No. PCT/US2012/071906 mailed Jul. 24, 2014.

* cited by examiner

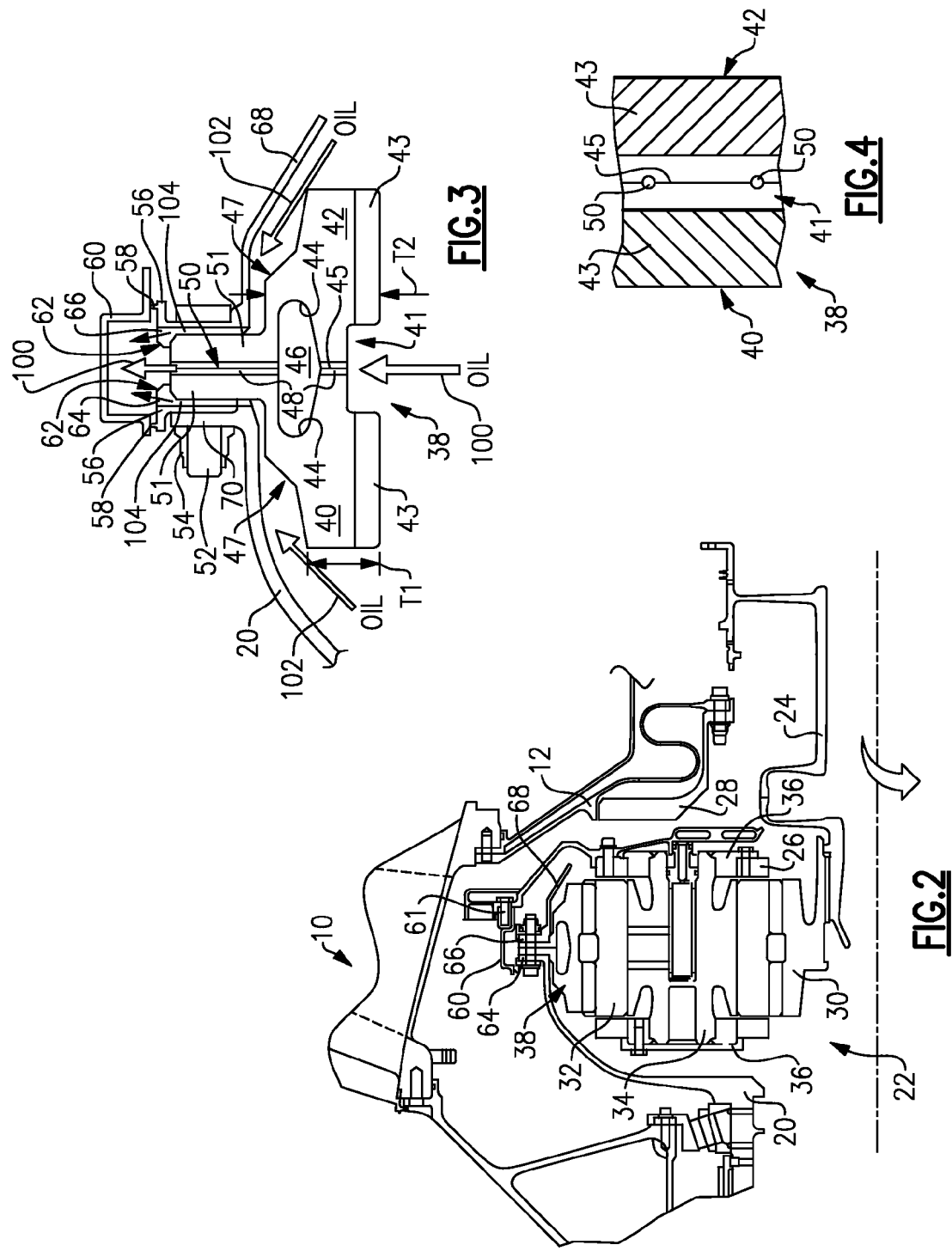

RING GEAR MOUNTING ARRANGEMENT WITH OIL SCAVENGE SCHEME

CROSS REFERENCE TO RELATED APPLICATIONS

The present disclosure is a continuation of U.S. patent application Ser. No. 13/484,579, filed May 31, 2012, which is a continuation of U.S. patent application Ser. No. 13/437,442, filed Apr. 2, 2012, which is a continuation of U.S. patent application Ser. No. 11/504,220, filed Aug. 15, 2006.

BACKGROUND

This invention relates to a ring gear used in an epicyclic gear train of a gas turbine engine.

Gas turbine engines typically employ an epicyclic gear train connected to the turbine section of the engine, which is used to drive the turbo fan. In a typical epicyclic gear train, a sun gear receives rotational input from a turbine shaft through a compressor shaft. A carrier supports intermediate gears that surround and mesh with the sun gear. A ring gear surrounds and meshes with the intermediate gears. In arrangements in which the carrier is fixed against rotation, the intermediate gears are referred to as "star" gears and the ring gear is coupled to an output shaft that supports the turbo fan.

Typically, the ring gear is connected to the turbo fan shaft using a spline ring. The spline ring is secured to a flange of the turbo fan shaft using circumferentially arranged bolts. The spline ring includes splines opposite the flange that supports a splined outer circumferential surface of the ring gear. The ring gear typically includes first and second portions that provide teeth facing in opposite directions, which mesh with complimentary oppositely facing teeth of the star gears.

An epicyclic gear train must share the load between the gears within the system. As a result, the splined connection between the ring gear and spline ring is subject to wear under high loads and deflection. Since the spline connection requires radial clearance, it is difficult to get a repeatable balance of the turbo fan assembly. Balance can also deteriorate over time with spline wear.

SUMMARY OF THE INVENTION

A turbine engine according to an exemplary embodiment of this disclosure, among other possible things includes a fan section including a plurality of fan blades, a turbine section, and an epicyclic gear train coupled between the turbine section and the fan section for providing a speed reduction between turbine section and the fan section. The epicyclic gear train includes a plurality of intermediate gears. A carrier supports the plurality of intermediate gears. A sun gear meshes with the plurality of intermediate gears and a ring gear surrounding and meshing with the plurality of intermediate gears. The ring gear includes first and second portions that each have an inner periphery with teeth. The first and second portions of the ring gear have an outer circumferential surface opposite the teeth that provides a first thickness, a second thickness greater than the first thickness and axially inward from the first thickness, and a flange extending radially away from the axis.

In a further embodiment of any of the foregoing turbine engines, the sun gear is rotatable in a first direction and the ring gear is rotatable in a second, opposite direction.

In a further embodiment of any of the foregoing turbine engines, further including an oil collection feature having an angled portion that is angled relative to the axis, and a radially aligned portion connected to the flange.

In a further embodiment of any of the foregoing turbine engines, the radially aligned portion further includes a groove operable to allow oil to pass through a connection between the radially aligned portion and the flange.

In a further embodiment of any of the foregoing turbine engines, the groove is at less than or equal to a 45 degree angle relative to the flanges.

In a further embodiment of any of the foregoing turbine engines, the groove is at an approximately zero degree angle relative to the flanges.

In a further embodiment of any of the foregoing turbine engines, the oil collection feature is an oil baffle.

In a further embodiment of any of the foregoing turbine engines, the oil baffle is secured to the flange and balanced with the fan shaft.

In a further embodiment of any of the foregoing turbine engines, the fan section includes a fan shaft driven by the epicyclic gear train and the oil collection feature is a portion of the fan shaft.

In a further embodiment of any of the foregoing turbine engines, the oil collection feature includes a first oil collection feature and a second oil collection feature.

In a further embodiment of any of the foregoing turbine engines, the first oil collection is the fan shaft and the second oil collection feature is an oil baffle.

An epicyclic gear train for a turbine engine according to an exemplary embodiment of this disclosure, among other possible things includes a plurality of intermediate gears, a carrier supporting the plurality of intermediate gears, a sun gear that meshes with the plurality of intermediate gears, and a ring gear surrounding and meshing with the plurality of intermediate gears the ring gear including first and second portions that each have an inner periphery with teeth. The first and second portions of the ring gear have an outer circumferential surface opposite the teeth that provides a first thickness, a second thickness greater than the first thickness and axially inward from the first thickness, and a flange extending radially away from said axis.

In a further embodiment of any of the foregoing epicyclic gear trains, the sun gear is rotatable in a first direction and the ring gear is rotatable in a second, opposite direction.

In a further embodiment of any of the foregoing epicyclic gear trains, further includes an oil collection feature having an angled portion that is angled relative to the axis, and a radially aligned portion connected to the flange.

In a further embodiment of any of the foregoing epicyclic gear trains, the radially aligned portion further includes at least one groove operable to allow oil to pass through a connection between said radially aligned portion and said flange.

In a further embodiment of any of the foregoing epicyclic gear trains, the at least one groove is at less than or equal to a 45 degree angle relative to the flanges.

In a further embodiment of any of the foregoing epicyclic gear trains, the at least one groove is at an approximately zero degree angle relative to the flanges.

In a further embodiment of any of the foregoing epicyclic gear trains, the oil collection feature is an oil baffle.

In a further embodiment of any of the foregoing epicyclic gear trains, includes a fan shaft driven by the epicyclic gear train. The oil baffle is secured to the flange and balanced with the fan shaft.

In a further embodiment of any of the foregoing epicyclic gear trains, the oil collection feature includes a first oil collection feature and a second oil collection feature and the first oil collection is the fan shaft and the second oil collection feature is an oil baffle.

A method of designing an epicyclic gear train for a turbine engine according to an exemplary embodiment of this disclosure, among other possible things includes defining a carrier for supporting a plurality of intermediate gears, defining a sun gear for meshing engagement with the plurality of intermediate gears, and configuring a ring gear to surround and mesh with the plurality of intermediate gears. The ring gear is configured to include first and second portions that each have an inner periphery with teeth. An outer circumferential surface opposite the teeth provides a first thickness, a second thickness greater than the first thickness and axially inward from the first thickness. A flange extends radially away from said axis.

In a further embodiment of any of the foregoing methods of designing an epicyclic gear train, includes configuring the sun gear to be rotatable in a first direction and the ring gear to be rotatable in a second, opposite direction.

In a further embodiment of any of the foregoing methods of designing an epicyclic gear train, further including configuring an oil collection feature having an angled portion that is angled relative to the axis, and a radially aligned portion for connection to the flange.

In a further embodiment of any of the foregoing methods of designing an epicyclic gear train, the radially aligned portion is further configured to include at least one groove operable to allow oil to pass through a connection between the radially aligned portion and the flange.

In a further embodiment of any of the foregoing methods of designing an epicyclic gear train, includes configuring the at least one groove to be less than or equal to a 45 degree angle relative to the flange.

In a further embodiment of any of the foregoing methods of designing an epicyclic gear train, includes configuring the at least one groove at an approximately zero degree angle relative to the flanges.

In a further embodiment of any of the foregoing methods of designing an epicyclic gear train, includes defining the oil collection feature as an oil baffle.

In a further embodiment of any of the foregoing methods of designing an epicyclic gear train, the oil collection feature includes a first oil collection feature and a second oil collection feature and the first oil collection is configured as part of a fan shaft and the second oil collection feature is an oil baffle.

BRIEF DESCRIPTION OF THE DRAWINGS

FIG. 2 is an enlarged cross-sectional view of the epicyclic gear train shown in FIG. 1.

FIG. 3 is an enlarged cross-sectional view of an example ring gear similar to the arrangement shown in FIG. 2.

FIG. 4 is a view of the ring gear shown in FIG. 3 viewed in a direction that faces the teeth of the ring gear in FIG. 3.

DETAILED DESCRIPTION OF THE PREFERRED EMBODIMENT

Figure 1:
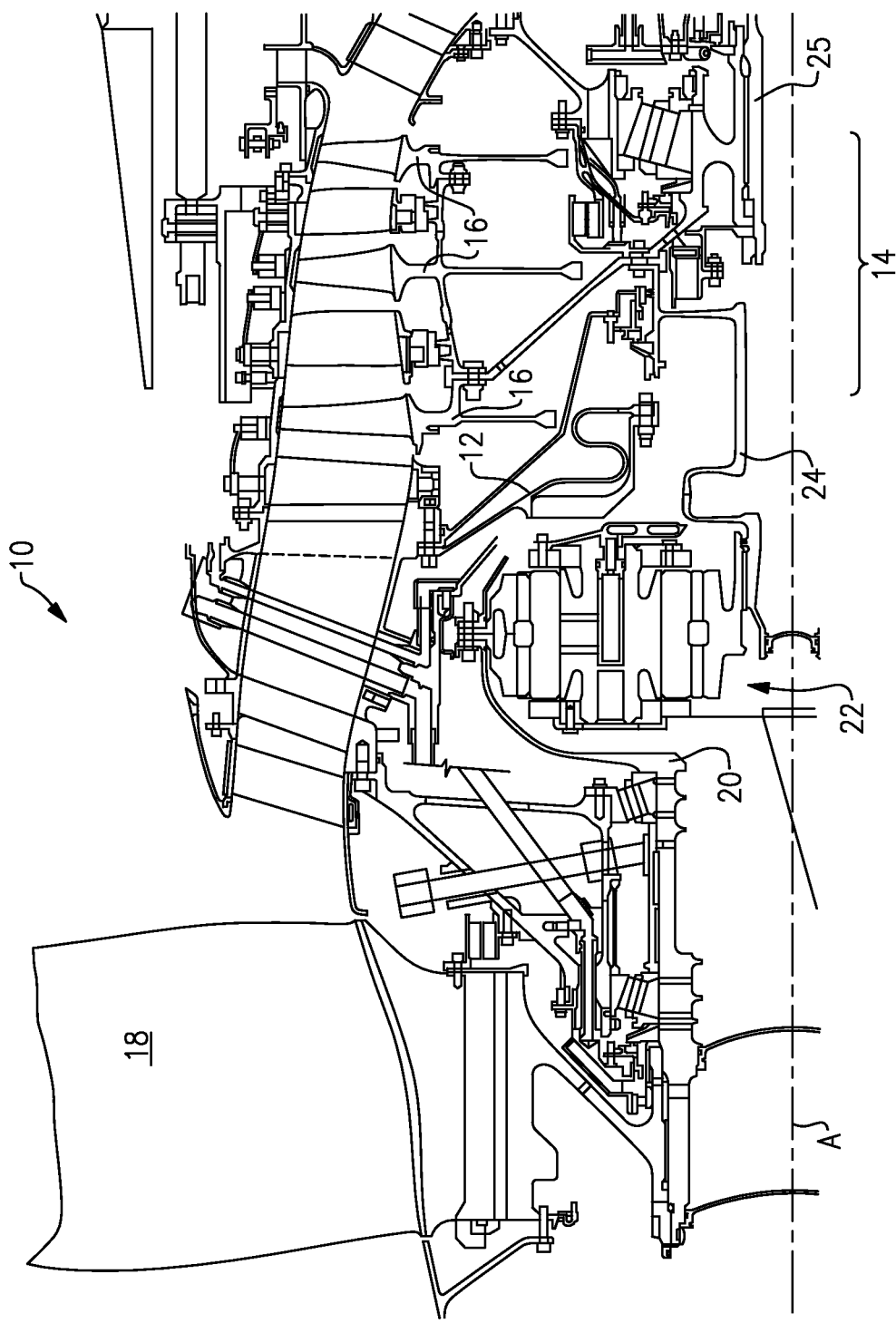
FIG. 1 is a partial cross-sectional view of a front portion of a gas turbine engine illustrating a turbo fan, epicyclic gear train and a compressor section.

A portion of a gas turbine engine 10 is shown schematically in FIG. 1. The turbine engine 10 includes a fixed housing 12 that is constructed from numerous pieces secured to one another. A compressor section 14 having compressor hubs 16 with blades are driven by a turbine shaft 25 about an axis A. A turbo fan 18 is supported on a turbo fan shaft 20 that is driven by a compressor shaft 24, which supports the compressor hubs 16, through an epicyclic gear train 22.

In the example arrangement shown, the epicyclic gear train 22 is a star gear train. Referring to FIG. 2, the epicyclic gear train 22 includes a sun gear 30 that is connected to the compressor shaft 24, which provides rotational input, by a splined connection. A carrier 26 is fixed to the housing 12 by a torque frame 28 using fingers (not shown) known in the art. The carrier 26 supports star gears 32 using journal bearings 34 that are coupled to the sun gear 30 by meshed interfaces between the teeth of sun and star gears 30, 32. Multiple star gears 32 are arranged circumferentially about the sun gear 30. Retainers 36 retain the journal bearings 34 to the carrier 26. A ring gear 38 surrounds the carrier 26 and is coupled to the star gears 32 by meshed interfaces. The ring gear 38, which provides rotational output, is secured to the turbo fan shaft 20 by circumferentially arranged fastening elements, which are described in more detail below. Due to the use of the sun gear 30 in the described arrangement of the epicyclic gear train 22, a worker of ordinary skill in the art would recognize that the sun gear 30 is rotatable in a first direction and the ring gear 38 is rotatable in a second, opposite direction.

Referring to FIGS. 3 and 4, the ring gear 38 is a two-piece construction having first and second portions 40, 42. The first and second portions 40, 42 abut one another at a radial interface 45. A trough 41 separates oppositely angled teeth 43 (best shown in FIG. 4) on each of the first and second portions 40, 42. The arrangement of teeth 43 forces the first and second portions 40, 42 toward one another at the radial interface 45. The back side of the first and second portions 40, 42 includes a generally S-shaped outer circumferential surface 47 that, coupled with a change in thickness, provides structural rigidity and resistance to overturning moments. The first and second portions 40, 42 have a first thickness T1 that is less than a second thickness T2 arranged axially inwardly from the first thickness T1. The first and second portions 40, 42 include facing recesses 44 that form an internal annular cavity 46.

The first and second portions 40, 42 include flanges 51 that extend radially outward away from the teeth 43. The turbo fan shaft 20 includes a radially outwardly extending flange 70 that is secured to the flanges 51 by circumferentially arranged bolts 52 and nuts 54, which axially constrain and affix the turbo fan shaft 20 and ring gear 38 relative to one another. Thus, the spline ring is eliminated, which also reduces heat generated from windage and churning that resulted from the sharp edges and surface area of the splines. The turbo fan shaft 20 and ring gear 38 can be rotationally balanced with one another since radial movement resulting from the use of splines is eliminated. An oil baffle 68 is also secured to the flanges 51, 70 and balanced with the assembly.

Seals 56 having knife edges 58 are secured to the flanges 51, 70. The first and second portions 40, 42 have grooves 48 at the radial interface 45 that form a hole 50, which expels oil through the ring gear 38 to a gutter 60 that is secured to the carrier 26 with fasteners 61 (FIG. 2). The direct radial flow path provided by the grooves 48 reduces windage and churning by avoiding the axial flow path change that existed with splines. That is, the oil had to flow radially and then axially to exit through the spline interface. The gutter 60 is constructed from a soft material such as aluminum so that the knife edges 58, which are constructed from steel, can cut into the aluminum if they interfere. Referring to FIG. 3, the seals 56 also include oil return passages 62 provided by first and second slots 64 in the seals 56, which permit oil on either side of the ring gear 38 to drain into the gutter 60. In the example shown in FIG. 2, the first and second slots 64, 66 are instead provided in the flange 70 and oil baffle 68, respectively.

During operation of the turbine engine 10, oil used to cool and lubricate the epicyclic gear train 22 is heated and expelled from the epicyclic gear train 22. Once expelled, the majority of the oil flows through the hole 50 along the oil flow path 100, illustrated by the hollow arrows in FIG. 3. A portion of the oil, however, escapes axially to either side of the first or second portion 40, 42. The heated oil has both a radial and a tangential velocity away from the axis. As the heated oil escapes to either side of the first or second portion, the radial velocity component causes the oil to be propelled radially outward and strike the angled (curved) portion of the turbofan shaft 20, or the angled portion of the oil baffle 68. The radial velocity component pushes the oil radially outward along the turbofan shaft 20 or the oil baffle 68 toward the flanges 70, as illustrated by the secondary oil path 102.

At the flanges 70, the oil passes through grooves 104 in the turbofan shaft 20 or the oil baffle 68, and through the first and second slots 64 in the seals. The grooves 104 are illustrated at a 0 degree angle relative to the adjacent flanges 70, however it is understood that the angular velocity of the oil passing through the grooves 104 can be controlled by altering the angle of the grooves 104 up to a 45 degree angle, relative to the adjacent flanges 70. The oil then drains into the gutter 60. Once entering the gutter 60, the tangential velocity of the oil causes the oil to continue to travel tangentially about the axis through the gutter 60 until the oil encounters a recollection feature that recollects the oil from the gutter 60. In this way, the oil passes to the gutter 60 through a secondary oil collection feature in addition to passing through the hole 50.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A turbine engine comprising:
   a fan section including a plurality of fan blades;
   a turbine section;
   an epicyclic gear train coupled between the turbine section and the fan section for providing a speed reduction between turbine section and the fan section, the epicyclic gear train including a plurality of intermediate gears, a carrier supporting the plurality of intermediate gears, a sun gear that meshes with the plurality of intermediate gears and a ring gear surrounding and meshing with the plurality of intermediate gears the ring gear including first and second portions that each have an inner periphery with teeth, wherein the first and second portions of the ring gear have an outer circumferential surface opposite the teeth that provides a first thickness, a second thickness greater than the first thickness and axially inward from the first thickness, and a flange extending radially away from said axis; and
   an oil collection feature having an angled portion that is angled relative to the axis, and a radially aligned portion connected to the flange.

2. The turbine engine as recited in claim 1, wherein the sun gear is rotatable in a first direction and the ring gear is rotatable in a second, opposite direction.

3. The turbine engine of claim 1, wherein said radially aligned portion further comprises a groove operable to allow oil to pass through a connection between said radially aligned portion and said flange.

4. The turbine engine of claim 3, wherein the groove is at less than or equal to a 45 degree angle relative to the flanges.

5. The turbine engine of claim 4, wherein the groove is at an approximately zero degree angle relative to the flanges.

6. The turbine engine of claim 1, wherein the oil collection feature is an oil baffle.

7. The turbine engine of claim 6, wherein the oil baffle is secured to the flange and balanced with the fan shaft.

8. The turbine engine of claim 1, wherein the fan section includes a fan shaft driven by the epicyclic gear train and the oil collection feature is a portion of the fan shaft.

9. The turbine engine of claim 8, wherein the oil collection feature comprises a first oil collection feature and a second oil collection feature.

10. The turbine engine of claim 9, wherein the first oil collection is the fan shaft and the second oil collection feature is an oil baffle.

11. An epicyclic gear train for a turbine engine comprising:
    a plurality of intermediate gears;
    a carrier supporting the plurality of intermediate gears;
    a sun gear that meshes with the plurality of intermediate gears;
    a ring gear surrounding and meshing with the plurality of intermediate gears the ring gear including first and second portions that each have an inner periphery with teeth, wherein the first and second portions of the ring gear have an outer circumferential surface opposite the teeth that provides a first thickness, a second thickness greater than the first thickness and axially inward from the first thickness, and a flange extending radially away from said axis; and
    an oil collection feature having an angled portion that is angled relative to the axis and a radially aligned portion connected to the flaw e.

12. The epicyclic gear train as recited in claim 11, wherein the sun gear is rotatable in a first direction and the ring gear is rotatable in a second, opposite direction.

13. The epicyclic gear train of claim 11, wherein said radially aligned portion further comprises at least one groove operable to allow oil to pass through a connection between said radially aligned portion and said flange.

14. The epicyclic gear train of claim 13, wherein the at least one groove is at less than or equal to a 45 degree angle relative to the flanges.

15. The epicyclic gear train of claim 13, wherein the at least one groove is at an approximately zero degree angle relative to the flanges.

16. The epicyclic gear train of claim 12, wherein the oil collection feature is an oil baffle.

17. The epicyclic gear train of claim 16, including a fan shaft driven by the epicyclic gear train and wherein the oil baffle is secured to the flange and balanced with the fan shaft.

18. The epicyclic gear train of claim 17, wherein the oil collection feature comprises a first oil collection feature and a second oil collection feature and the first oil collection is the fan shaft and the second oil collection feature is an oil baffle.

19. A method of designing an epicyclic gear train for a turbine engine comprising:
    defining a carrier for supporting a plurality of intermediate gears;
    defining a sun gear for meshing engagement with the plurality of intermediate gears; and
    configuring a ring gear to surround and mesh with the plurality of intermediate gears, wherein the ring gear is configured to include first and second portions that each have an inner periphery with teeth, an outer circumferential surface opposite the teeth that provides a first thickness, a second thickness greater than the first thickness and axially inward from the first thickness, and a flange extending radially away from said axis; and configuring an oil collection feature having an angled portion is angled relative to the axis, and a radially aligned portion for connection to the flange.

20. The method of designing an epicyclic gear train as recited in claim 19, including configuring the sun gear to be rotatable in a first direction and the ring gear to be rotatable in a second, opposite direction.

21. The method of designing an epicyclic gear train as recited in claim 19, wherein the radially aligned portion is further configured to include at least one groove operable to allow oil to pass through a connection between the radially aligned portion and the flange.

22. The method of designing an epicyclic gear train of claim 21, including configuring the at least one groove to be less than or equal to a 45 degree angle relative to the flange.

23. The method of designing an epicyclic gear train of claim 21, including configuring the at least one groove at an approximately zero degree angle relative to the flanges.

24. The method of designing an epicyclic gear train of claim 21, including defining the oil collection feature as an oil baffle.

25. The method of designing an epicyclic gear train of claim 24, wherein the oil collection feature comprises a first oil collection feature and a second oil collection feature and the first oil collection is configured as part of a fan shaft and the second oil collection feature is an oil baffle.

* * * * *

UNITED STATES PATENT AND TRADEMARK OFFICE
CERTIFICATE OF CORRECTION

| | | |
|---|---|---|
| PATENT NO. | : 9,115,650 B2 | Page 1 of 1 |
| APPLICATION NO. | : 14/293279 | |
| DATED | : August 25, 2015 | |
| INVENTOR(S) | : McCune et al. | |

It is certified that error appears in the above-identified patent and that said Letters Patent is hereby corrected as shown below:

IN THE CLAIMS:

In claim 10, column 6, line 16; after "collection" insert --feature--

In claim 11, column 6, line 34; delete "flaw e" and replace with --flange--

In claim 19, column 6, line 62; delete "and"

In claim 20, column 7, line 5; prior to "is" insert --that--

In claim 25, column 7, line 28; after "collection" insert --feature--

Signed and Sealed this
Nineteenth Day of April, 2016

Michelle K. Lee
*Director of the United States Patent and Trademark Office*